United States Patent [19]
Cinadr

[11] 3,718,053
[45] Feb. 27, 1973

[54] TILT STEERING WHEEL MECHANISM

[75] Inventor: James J. Cinadr, Parma, Ohio

[73] Assignee: General Motors Corporation, Detroit, Mich.

[22] Filed: Oct. 4, 1971

[21] Appl. No.: 186,097

[52] U.S. Cl. ..................... 74/493, 180/78, 280/87 A
[51] Int. Cl. ............................................. B62d 1/18
[58] Field of Search ..74/493, 492; 180/78; 280/87 A

[56] References Cited

UNITED STATES PATENTS 3,412,629  11/1968  Hill ......................................... 74/493
3,504,569  4/1970  Zoltok ..................................... 74/493

*Primary Examiner*—Milton Kaufman
*Attorney*—J. L. Carpenter et al.

[57] ABSTRACT

A tilt steering wheel mechanism having a column, the lower end of which is connected to a remotely controlled adjuster mechanism having a positioning member and a slidable bolt cooperating with the positioning member permitting the column to be pivoted to predetermined points about a horizontal axis for locking the wheel in an adjusted position.

2 Claims, 5 Drawing Figures

INVENTOR.
James J. Cinadr
BY
C. J. Bishop
ATTORNEY

INVENTOR.
James J. Cinadr
BY
E. F. Bishop
ATTORNEY

TILT STEERING WHEEL MECHANISM

This invention concerns a tilt steering wheel mechanism of the type that can be employed with a vehicle and permits the steering wheel to be adjustably positioned about a horizontal axis so as to locate the steering wheel in a comfortable driving position and also to facilitate access to and egress from the driver's station. More particularly, the tilt steering wheel mechanism made in accordance with the invention includes a steering wheel which is rotatably supported at the upper end of a column. A bracket having rearwardly projecting arms supports the lower end of the column for pivotal movement about a horizontal axis extending transversely to the longitudinal axis of the vehicle. A positioning member is formed with the lower end of the column and is located in the plane of movement of the column. The positioning member has a series of vertically aligned openings formed therein with each opening representing a position of the steering wheel to which the latter can be moved. The bracket carries a spring biased remotely operated bolt which is adapted to be inserted into one of the openings in the positioning member for locking the steering wheel in a desired position about the aforementioned horizontal axis.

The objects of the present invention are to provide a tilt steering wheel mechanism that supports the lower end of a steering column and includes a remotely controlled latch for adjusting the steering wheel about a horizontal axis; to provide an adjuster mechanism for tilting a steering wheel assembly about a horizontal axis and that is mountable to the vehicle forwardly of the steering column; to provide a mechanism that adjusts the position of a steering wheel connected to a column and that incorporates a latching means having a bolt that is movable into one of a series of vertically aligned openings formed in a positioning member attached to the lower end of the column for locating the steering wheel in a predetermined position about a horizontal axis; and to provide an adjuster device for moving a steering wheel column about a horizontal axis that includes a remotely controlled latching means having a slidable bolt that is adapted to lock the column in the adjusted position by moving into one of a series of vertically aligned openings which have their longitudinal axes located in a plane that is substantially perpendicular to said horizontal axis.

Other objects and advantages of the present invention will be apparent from the following detailed description when taken with the drawings in which.

Figure 2:
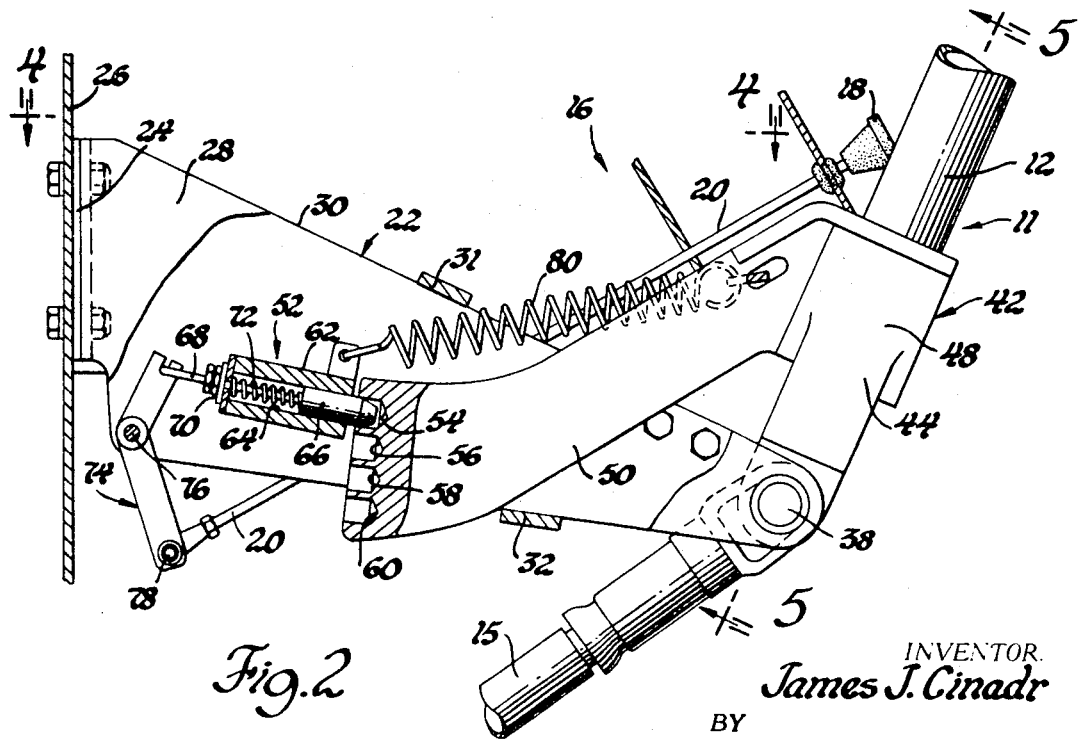
FIG. 2 is an enlarged elevational view showing the tilt steering wheel mechanism of FIG. 1 located in the fully raised position.
Figure 3:
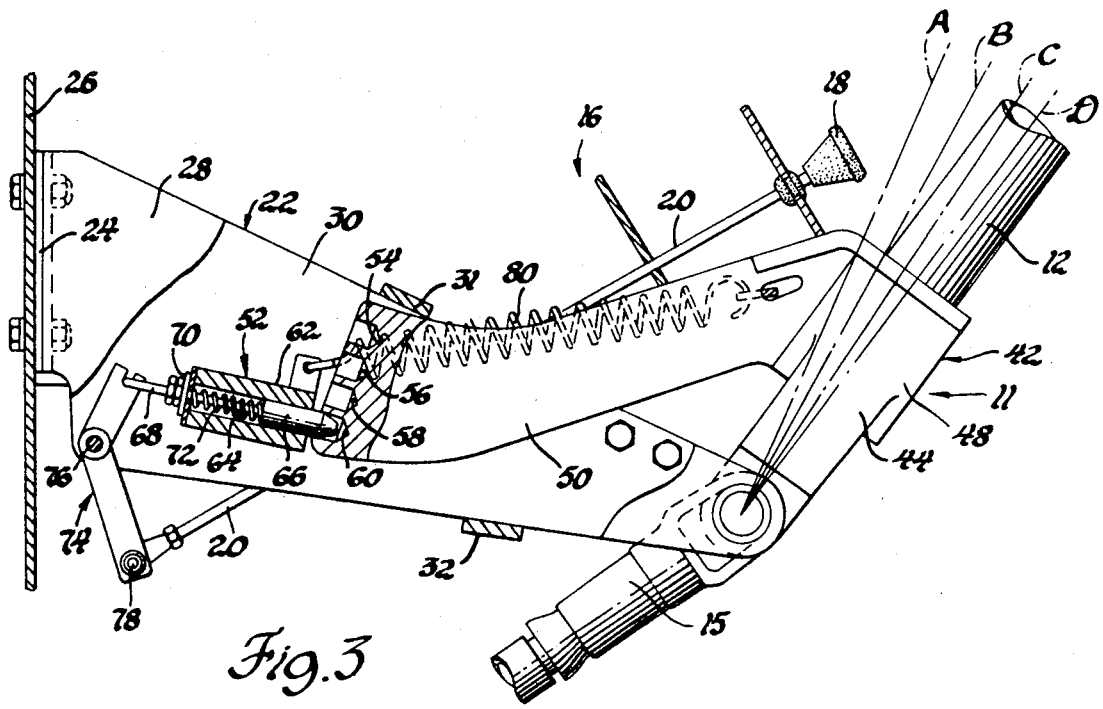
Figure 4:
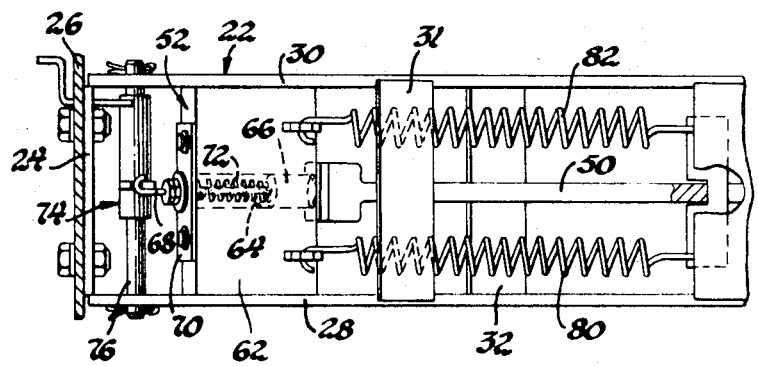
Figure 5:
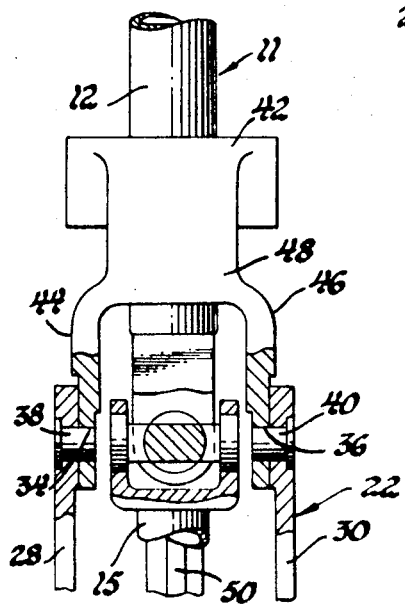

FIG. 3 is a view similar to FIG. 2 but shows the tilt steering wheel mechanism in the fully lowered position; and FIGS. 4 and 5 are sectional views taken on lines 4—4 and 5—5 respectively of FIG. 2.

Figure 1:
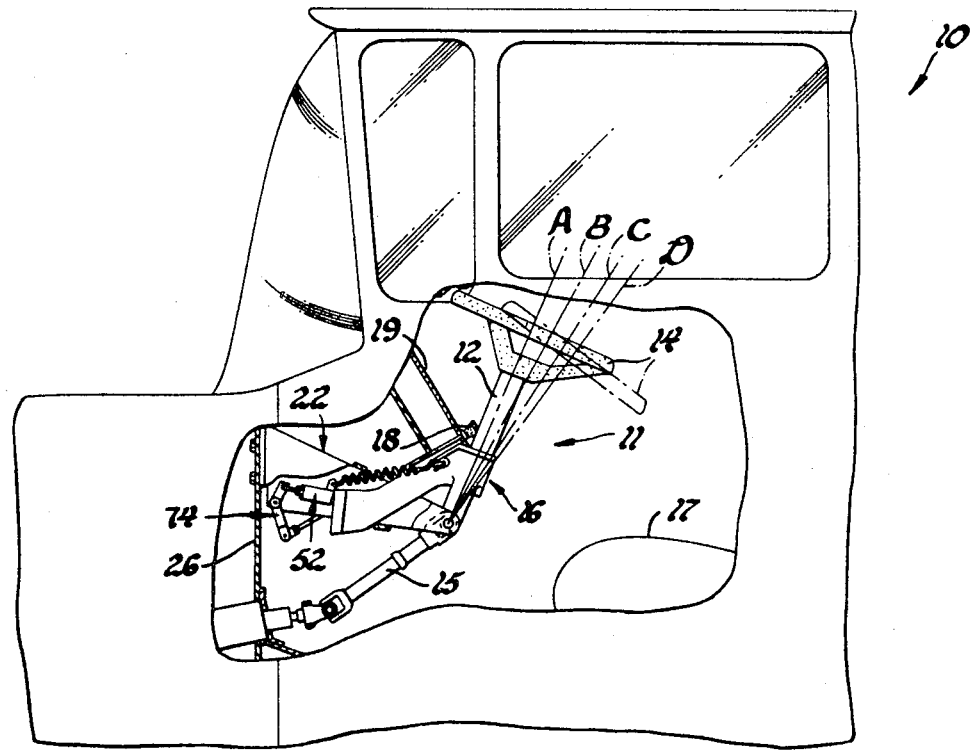
FIG. 1 shows the cab portion of a vehicle incorporating a tilt steering wheel mechanism made in accordance with the invention.

Referring now to the drawings and more particularly to FIG. 1 thereof, a cab portion 10 of a vehicle is shown incorporating a steering column assembly 11 including a column 12, the upper end of which has a rotatable steering wheel 14. The lower end of the column 12 is connected to a lower steering shaft 15 through a tilt steering wheel mechanism 16 made in accordance with the invention which permits the steering column assembly 11 to be adjusted to various positions about a horizontal axis extending transversely to the longitudinal axis of the vehicle. As seen, the mechanism 16 allows for movement of the steering wheel 14 between a fully raised position which is indicated by the letter A and a fully lowered position shown in phantom lines and indicated by the letter D. The mechanism 16 also allows for two intermediate adjusted positions which are indicated by the letters B and C. Thus, the vehicle operator when sitting in the driver's seat 17, is able to locate the steering wheel 14 in a position which is most comfortable for driving and such positioning can be accomplished by use of a remotely located actuator 18 mounted on the vehicle instrument panel 19 and connected through an axially extensible link 20 to the mechanism 16.

As seen in FIGS. 2 through 5, the mechanism 16 includes a U-shaped support bracket 22, the base portion 24 of which is rigidly secured to a vertically orientated support plate 26 located forwardly of the instrument panel 19. The laterally spaced arms 28 and 30 of the support bracket 22 are interconnected by horizontally spaced upper and lower stop bars 31 and 32 respectively and have the rear thereof formed with axially aligned bores 34 and 36. The latter mentioned bores respectively accommodate pivot pins 38 and 40 which support the lower end of the steering column assembly 11 which includes a pivot housing 42. As best seen in FIGS. 2 and 5, the pivot housing 42 comprises a pair of laterally spaced support arms 44 and 46 which are respectively pivotally connected by pivot pins 38 and 40 to the arms 28 and 30. The arms 44 and 46 are integrally formed with the sides of a generally cylindrical collar 48 which is fixed to the lower end of the column 12. As is conventional, the column 12 supports a rotatably upper steering shaft (not shown) which is connected at its upper end to the steering wheel 14. The lower end of the upper steering shaft is connected through a universal joint (not shown) to the upper end of the lower steering shaft 15. As should be apparent, the universal joint would be so located whereby the steering column assembly 11 is movable about the aforementioned horizontal axis which extends through the longitudinal centers of the pivot pins 38 and 40.

In order to lock the steering column assembly 11 in an adjusted position about the aforementioned horizontal axis, a latching means is provided which includes a positioning member 50 and a bolt assembly 52. As seen in FIGS. 2 and 4, the positioning member 50 is integrally formed with and projects forwardly and downwardly from the collar 48 and is located in the vertical plane of movement of the column 12 as provided by the pivot pins 38 and 40. The free end of the positioning member is formed with four vertically aligned cylindrical openings 54, 56, 58, and 60. These latter mentioned openings are located in the plane of the positioning member and each is adapted to cooperate with the bolt assembly 52 for locking the steering wheel 14 in one of the adjusted positions A, B, C, and D.

The bolt assembly 52 comprises a transverse bar 62, the side edges of which are rigidly secured to the arms 28 and 30 of the support bracket 22. A cylindrical opening 64 extends through the bar 62 and has its longitudinal axis located in the plane of positioning member 50. A bolt 66 is supported in the opening 64 for reciprocable movement and has the rear portion thereof fixed to a J-shaped rod 68 which extends through a plate 70 secured to the bar 62. A coil spring 72 is wound around the inner portion of the rod 68 and has the opposite ends thereof contacting the plate 70 and the bolt 66 to bias the latter into the position seen in FIG. 2. The bolt 66 is connected through the rod 68 to the upper arm of a lever 74. The lever, in turn, is pivotally connected to the bracket 22 by a shaft 76 and has the lower arm thereof joined by a pivotal connection 78 to the link 20.

From the above it should be apparent that the spring 72 normally biases the bolt 66 into the extended position shown in FIG. 2. In such position, the bolt is located within the opening 54 formed in the free end of the positioning member 50 and thereby locks the steering column assembly 11 in the position A. The spring 72 and the opening 56 in bar 62 in which the spring is located are dimensioned so that upon retraction of the bolt 66, the latter is moved completely out of the accommodating opening to free the steering column assembly 11 and permit it to be moved to a new adjusted position B, C, or D. In this regard, it will be noted that a pair of coil springs 80 and 82 are connected between the pivot housing 42 and the bar 62. The springs 80 and 82 continuously bias the steering column assembly 11 in a counterclockwise direction about the pivot pins 38 and 40.

The operation of the above-described invention is as follows: With the parts located as shown in FIGS. 1 and 2, the steering column assembly 11 is locked in the extreme forward position which is indicated by the letter A. As should be apparent, the four openings 54, 56, 58, and 60 formed in the positioning member 50 allow the steering wheel 14 to be positioned in the positions A, B, C, and D respectively. Thus, assuming that it is desired to move the steering wheel 14 from the position A to the position D, which is the extreme rearward position, the actuator 18 is manually pulled so as to cause the lever 74 to pivot in a counterclockwise direction about shaft 76 to draw the rod 68 to the left and thereby retract the bolt 66 from opening 54 against the bias of the spring 72. This action causes the bolt 66 to assume the phantom line position of FIG. 2 and permits the operator then to manually move the steering wheel 14 against the bias of springs 80 and 82 downwardly in a manner so that the column 12 pivots in a clockwise direction about the pivot pins 38 and 40. During such movement, the free end of the positioning member 50 moves upwardly until it engages the upper stop bar 31 at which time the bolt 66 is axially aligned with the opening 60. The operator then releases the actuator 18 permitting the spring 72 to extend the bolt 66 into the opening 60 to thereby lock the steering column assembly 11 in the position D shown in FIG. 3. To return the steering column assembly 11 to the extreme forward position A of FIG. 2 or to the intermediate positions indicated by lines B and C, the actuator 18 would once again have to be pulled outwardly so as to retract the bolt 66 from opening 60. Thereafter, the steering column assembly 11 would move under the influence of springs 80 and 82 and the column 12 would pivot in a clockwise direction about the pivot pins 38 and 40. The actuator 18 would then be released when the steering wheel 14 reaches the desired position so as to again permit the bolt 66 to move into the accommodating opening for the position desired.

Various changes and modifications can be made in this construction without departing from the spirit of the invention. Such changes and modifications are contemplated by the inventor and he does not wish to be limited except by the scope of the appended claims.

What is claimed is:

1. A tilt steering wheel mechanism for a vehicle including a steering wheel rotatably supported at the upper end of a column, a housing pivotally supporting the lower end of said column, a bracket having a pair of laterally spaced arms supporting the housing for angular movement about a horizontal axis extending transversely to the longitudinal axis of the vehicle, a positioning member projecting from said housing and having the free end thereof located between vertical planes passing through said arms, the free end of said positioning member having a plurality of vertically aligned openings formed therein with each opening representing an adjusted position of the column about said horizontal axis, latching means carried by said bracket and having a bolt engageable with one of said openings in the free end of said positioning member for locking the column in a predetermined fixed position, a spring connected between said housing and the bracket for continuously urging the column in one direction about said horizontal axis, and a remotely located actuator connected to said bolt for retracting the latter from said one of said openings so as to permit the column to be adjusted to a new position about said horizontal axis.

2. A tilt steering wheel mechanism for a vehicle including a steering wheel rotatably supported at the upper end of a column, a housing rotatably supporting the lower end of said column, a bracket having a pair of laterally spaced arms supporting the housing for angular movement about a horizontal axis between two extreme positions, and positions therebetween, a positioning member projecting from said housing and having the free end thereof located between vertical planes passing through said arms, the free end of said positioning member having a plurality of openings formed therein along a vertical plane that is perpendicular to said horizontal axis and each of said openings representing an adjusted position of the column about said horizontal axis, stop means carried by the bracket and engageable by the positioning member when the column is located in both of said extreme positions, latching means carried by said bracket and having a bolt engageable with one of said openings in the free end of said member for locking the column in a predetermined fixed position, a spring connected between said housing and the bracket for continuously urging the column in one direction about said horizontal axis, and a remotely located actuator connected to said bolt for retracting the latter from said one of said openings so as to permit the column to be adjusted to a new position about said horizontal axis.

* * * * *